(12) United States Patent
Folsom

(10) Patent No.: US 7,708,298 B1
(45) Date of Patent: May 4, 2010

(54) METHOD OF PREVENTING MOTORCYCLE REPAIR INJURIES

(76) Inventor: Michael C. Folsom, 55 Harley La., Bishopville, SC (US) 29010

( * ) Notice: Subject to any disclaimer, the term of this patent is extended or adjusted under 35 U.S.C. 154(b) by 322 days.

(21) Appl. No.: 11/858,622

(22) Filed: Sep. 20, 2007

(51) Int. Cl.
*B62J 27/00* (2006.01)
*B65D 65/02* (2006.01)

(52) U.S. Cl. .................................. 280/304.3; 150/167
(58) Field of Classification Search ............... 180/219; 280/304.3, 304.4; 150/154, 155, 166, 167
See application file for complete search history.

(56) References Cited

U.S. PATENT DOCUMENTS

| | | | |
|---|---|---|---|
| 2,844,047 A * | 7/1958 | Schaefer | 74/551.8 |
| 4,105,220 A | 8/1978 | Pacific | |
| 4,141,567 A * | 2/1979 | Scott | 280/304.3 |
| 4,403,787 A * | 9/1983 | Shimano | 280/304.3 |
| 5,219,104 A | 6/1993 | Hinschlager et al. | |
| 5,577,607 A | 11/1996 | Drake et al. | |
| D388,026 S * | 12/1997 | DeFur | D12/114 |
| 6,209,599 B1 * | 4/2001 | Richardson | 150/167 |
| D447,444 S * | 9/2001 | Rougier | D12/114 |
| D470,980 S | 2/2003 | Bignon et al. | |
| 6,561,058 B1 * | 5/2003 | Steinke | 74/551.9 |
| 7,137,422 B2 * | 11/2006 | McMillen | 150/167 |
| 7,219,395 B2 * | 5/2007 | Bigolin | 16/421 |
| 2003/0121359 A1 | 7/2003 | Pacheco | |
| 2003/0192395 A1 * | 10/2003 | Hsu | 74/551.9 |
| 2004/0134303 A1 | 7/2004 | Durham | |

* cited by examiner

*Primary Examiner*—Lesley Morris
*Assistant Examiner*—Marc A Scharich

(57) ABSTRACT

A method of preventing motorcycle repair injuries includes a motorcycle having a handlebar. A grip and a lever are attached to and form a terminal end of the handlebar. A primary sleeve has an end wall and a perimeter wall that is attached the end wall. The perimeter wall has a distal end with respect to the end wall. The distal end defines a primary opening into an interior of the primary sleeve. The grip extends into the primary opening and is covered by the primary sleeve. The primary sleeve prevents injury to a mechanic working on the motorcycle.

5 Claims, 5 Drawing Sheets

METHOD OF PREVENTING MOTORCYCLE REPAIR INJURIES

BACKGROUND OF THE INVENTION

Field of the Invention

The present invention relates to injury preventing devices and more particularly pertains to a new injury preventing device for preventing injury to a motorcycle mechanic from the handlebars when the mechanic is working on a motorcycle.

SUMMARY OF THE INVENTION

The present invention meets the needs presented above by generally providing a motorcycle having a handlebar. A grip and a lever being attached to and forming a terminal end of the handlebar. A primary sleeve has an end wall and a perimeter wall that is attached the end wall. The perimeter wall has a distal end with respect to the end wall. The distal end defines a primary opening into an interior of the primary sleeve. The grip extends into the primary opening and is covered by the primary sleeve. The primary sleeve prevents injury to a mechanic working on the motorcycle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
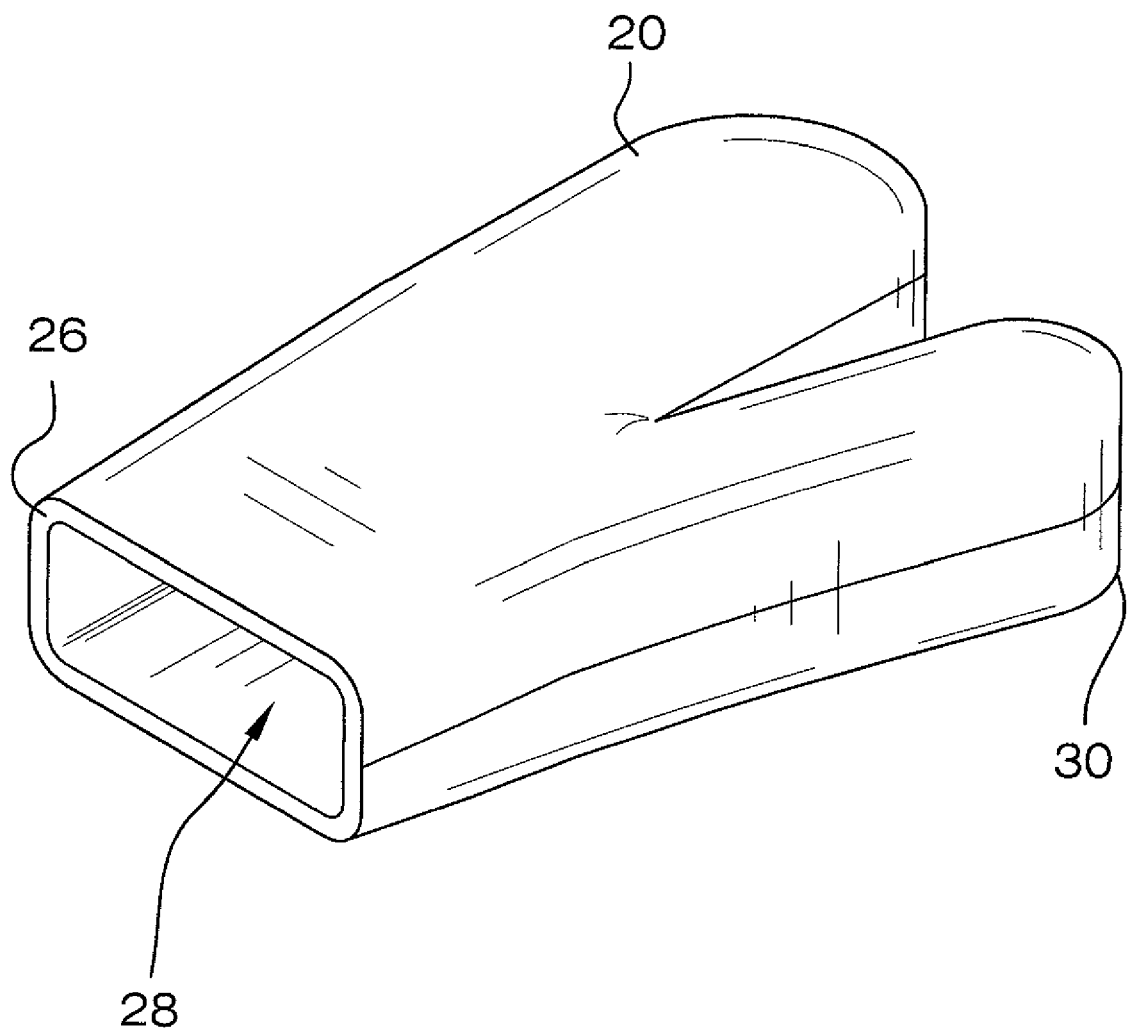
FIG. 1 is a perspective view of a primary and secondary sleeve of a method of preventing motorcycle repair injuries according to the present invention.
Figure 2:
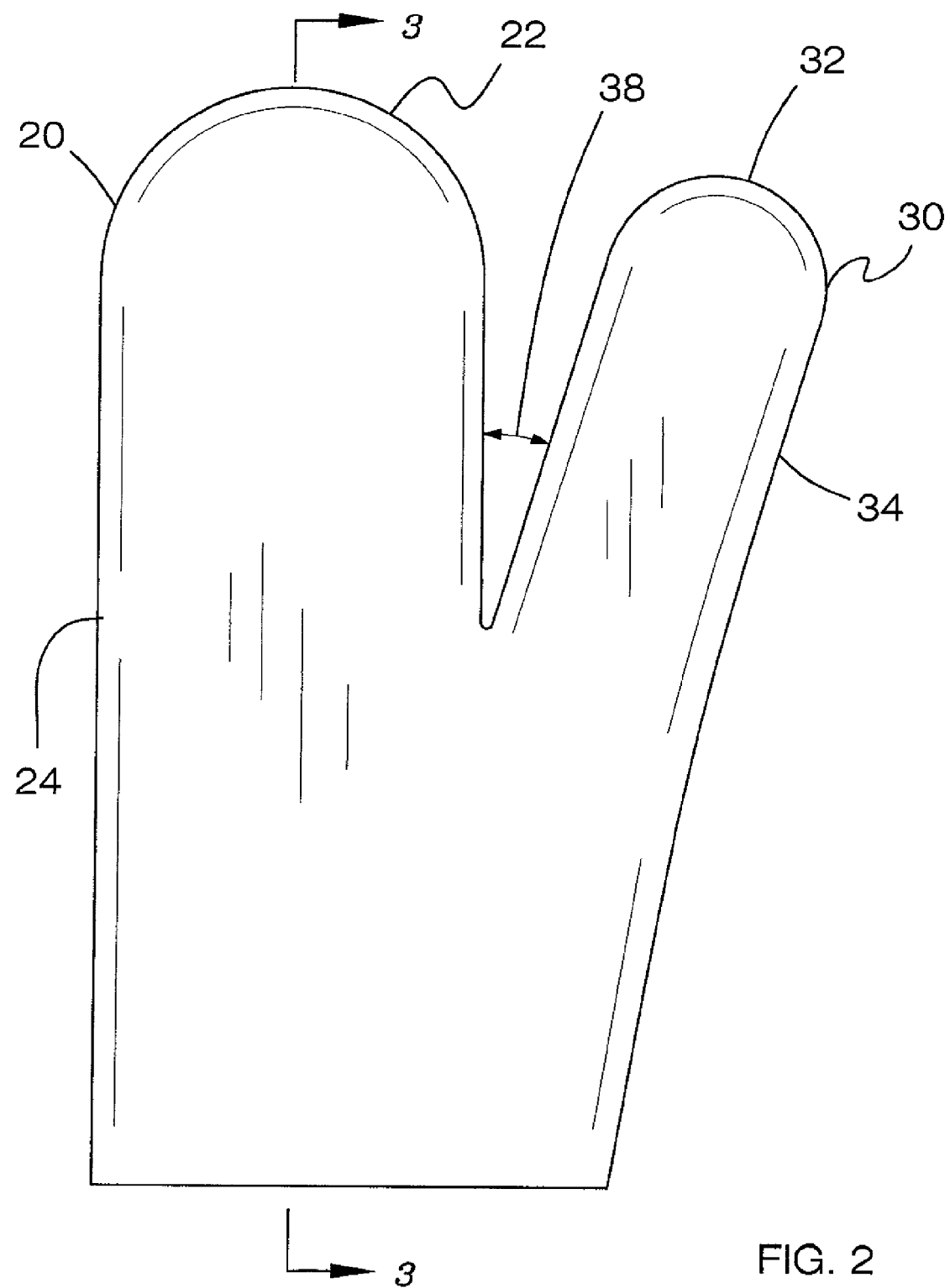
FIG. 2 is a front view of the present invention.
Figure 3:
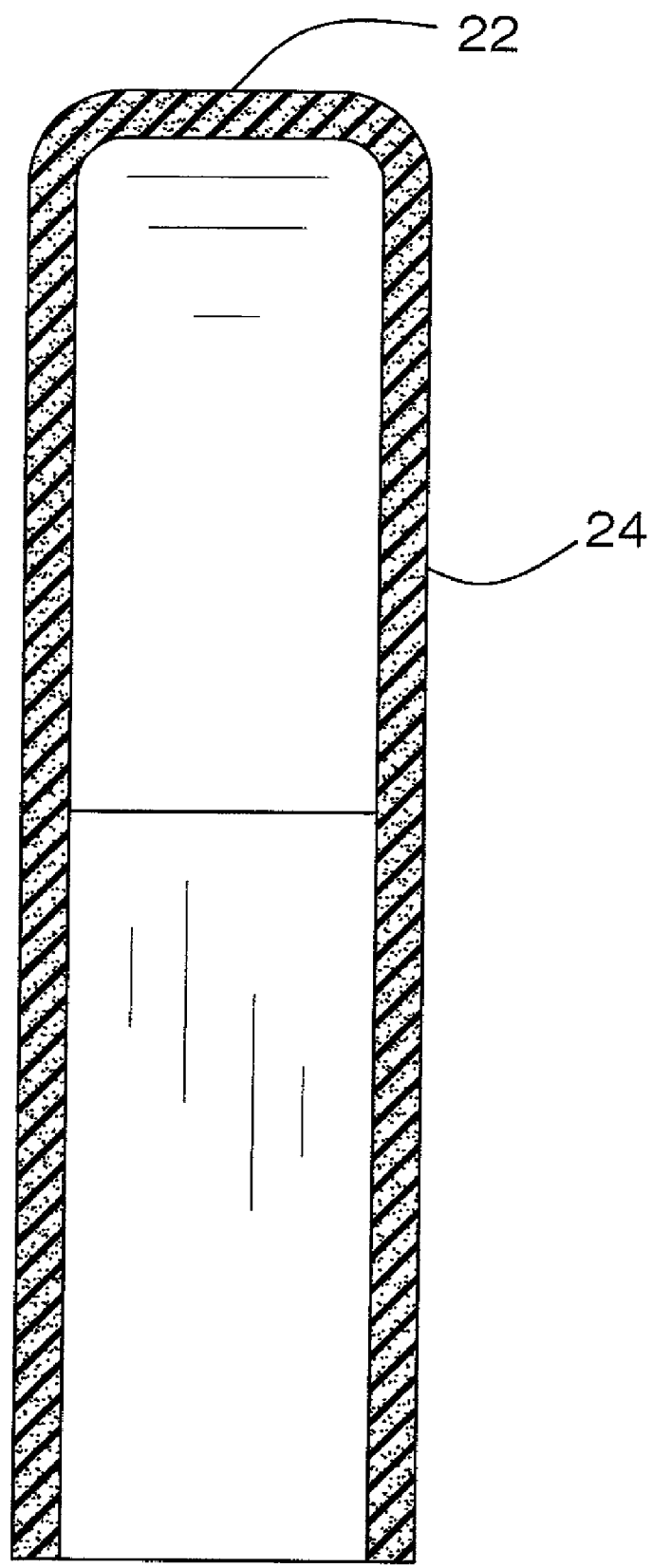
FIG. 3 is a cross-sectional view taken along line 3-3 of FIG. 2 of the present invention.
Figure 4:
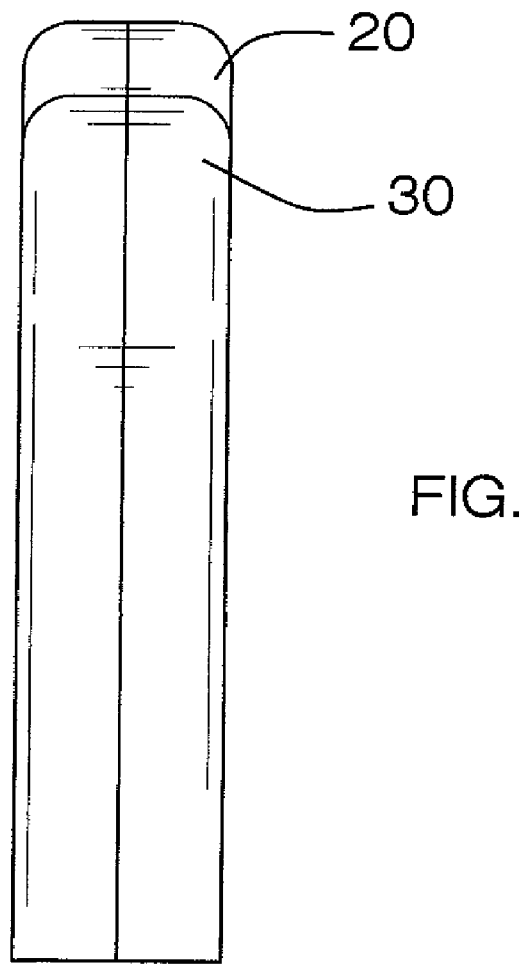
FIG. 4 is a side view of the present invention.
Figure 5:
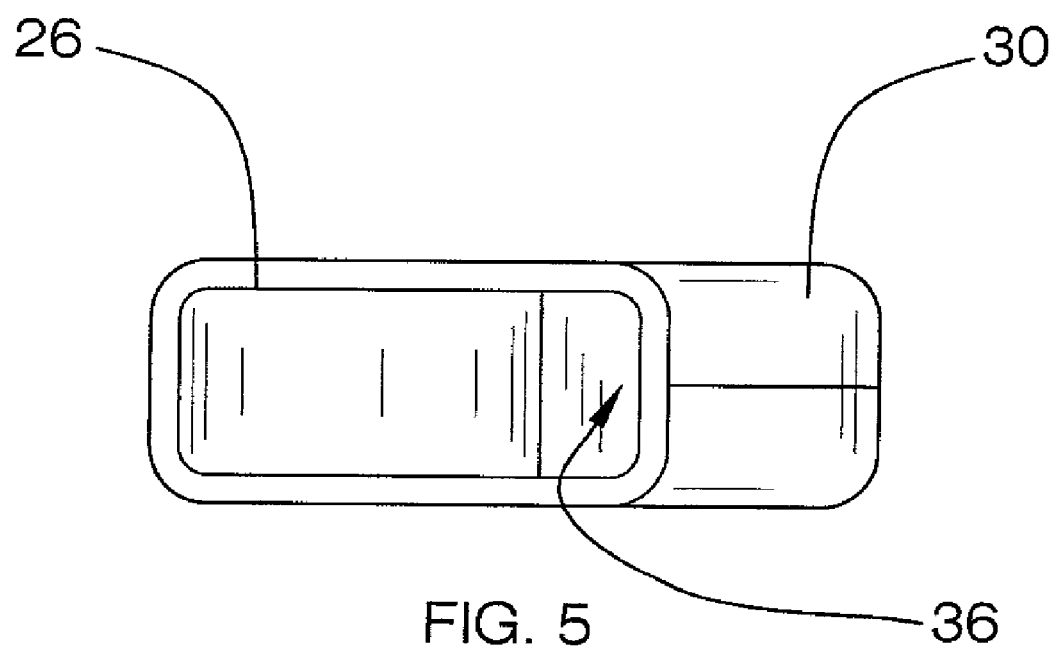
FIG. 5 is a bottom view of the present invention.
Figure 6:
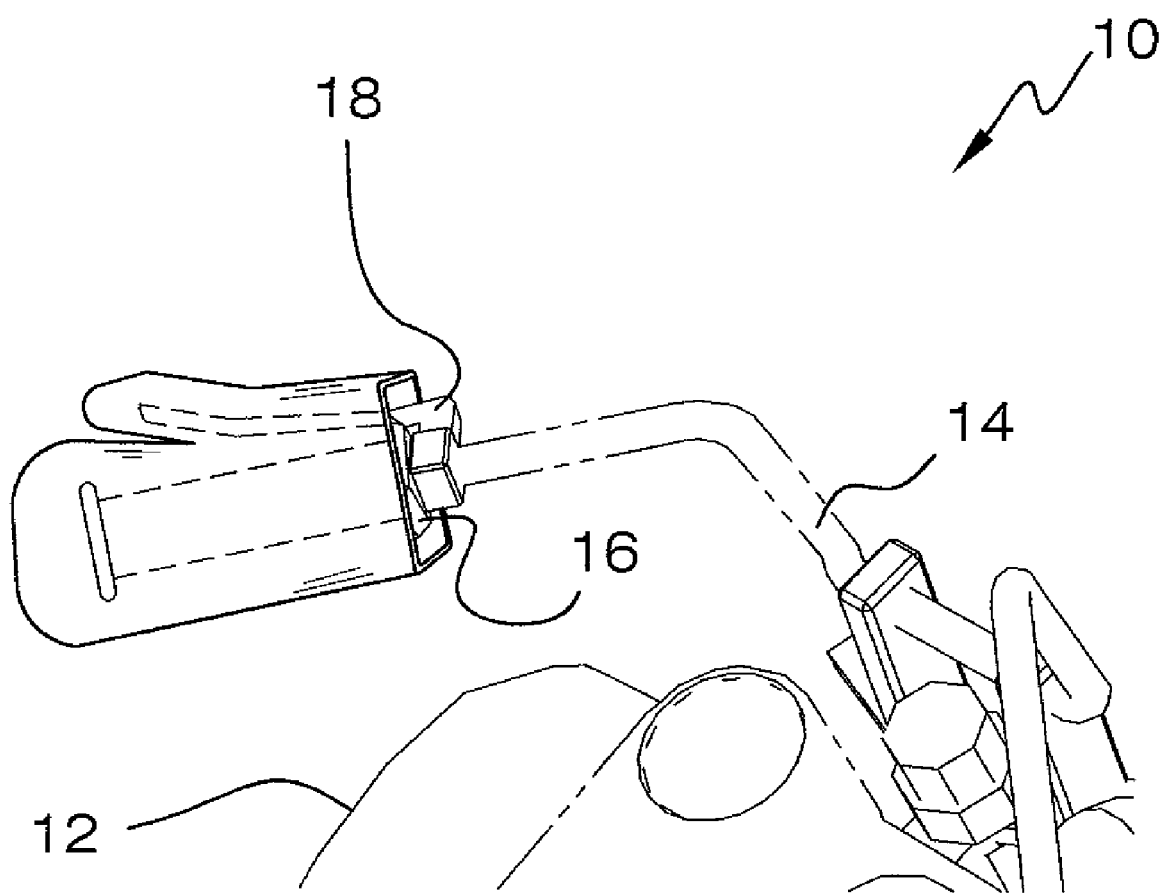
FIG. 6 is a perspective view of the present invention.

With reference now to the drawings, and in particular to FIGS. 1 through 6 thereof, a new injury preventing device embodying the principles and concepts of the present invention and generally designated by the reference numeral 10 will be described.

As best illustrated in FIGS. 1 through 6, the method 10 of preventing motorcycle repair injuries generally includes providing a motorcycle 12 with a handlebar 14. A grip 16 and a lever 18 are each attached to and form a terminal end of the handlebar 12. The motorcycle 12 is conventional and will include a pair of handlebars 14 each with a grip 16 and a lever 18.

A primary sleeve 20 is provided that has an end wall 22 and a perimeter wall 24 attached the end wall 22. The perimeter wall 24 has a distal end 26 with respect to the end wall 22. The distal end 26 defines a primary opening 28 into an interior of the primary sleeve 20. The primary sleeve 20 is comprised of a resiliently compressible material. The grip 16 is extended into the primary opening 28 to cover the grip 16 with the primary sleeve 20.

A secondary sleeve 30 is also provided. The secondary sleeve 30 has a back wall 32 and a peripheral wall 34 that is attached to and extends away from the back wall 32. The peripheral wall 34 is attached to the perimeter wall 24 to place an interior of the secondary sleeve 30 in communication with the interior of the primary sleeve 20. A juncture of the perimeter wall 24 and the peripheral wall 34 forms a secondary opening 36. The secondary sleeve 30 is comprised of a resiliently compressible material. The secondary sleeve 30 extends away from primary opening 28 and the secondary sleeve 30 forms an angle 38 with respect to the perimeter wall 24 between 10 degrees and 45 degrees. The lever 18 is extended into the secondary sleeve 30 when the grip 16 is extended into the primary sleeve 20 to cover the lever 18 with secondary sleeve 30.

In use, when the grip 16 and lever 18 are placed in the primary 20 and secondary 30 sleeves, respectively, the grip 16 and lever 18 are covered while a mechanic works on the motorcycle 12. The primary sleeve 20 prevents injury to the mechanic by the grip 16 and the secondary sleeve 18 prevents injury to the mechanic by the lever 18. In this manner, there is little risk of the mechanic injuring their eye or head. A second primary 20 and secondary 30 sleeve combination are positioned on the other one of the handlebars 14.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method of preventing injury to a motorcycle mechanic, said method comprising the steps of:

providing a motorcycle including a handlebar, a grip and a lever, said grip and said lever being attached to and forming a terminal end of said handlebar;

providing a primary sleeve having an end wall and a perimeter wall being attached to said end wall, said perimeter wall having a distal end with respect to said end wall, said distal end defining a primary opening into an interior of said primary sleeve;

extending said grip into said primary opening and covering said grip with said primary sleeve;

providing a secondary sleeve, said secondary sleeve having a back wall and a peripheral wall being attached to and extending away from said back wall, said peripheral wall being attached to said perimeter wall to place an interior of said secondary sleeve in communication with the interior of said primary sleeve, a juncture of said perimeter wall and said peripheral wall forming a secondary opening;

extending said lever into said secondary sleeve when said grip is extended into said primary sleeve to cover said lever with said secondary sleeve; and working on the motorcycle by a mechanic, said primary sleeve and said secondary sleeve preventing injury to the mechanic by said grip and said lever.

2. The method of claim 1, wherein the step of providing said secondary sleeve further includes said secondary sleeve being comprised of a resiliently compressible material.

3. The method of claim 2, wherein the step of providing said secondary sleeve further includes said secondary sleeve extending away from said primary opening, said secondary sleeve forming an angle with respect to said perimeter wall between 10 degrees and 45 degrees.

4. The method of claim 1, wherein the step of providing said secondary sleeve further includes said secondary sleeve extending away from said primary opening, said secondary sleeve forming an angle with respect to said perimeter wall between 10 degrees and 45 degrees.

5. A method of preventing injury to a motorcycle mechanic, said method comprising the steps of:

providing a motorcycle including a handlebar, a grip and a lever, said grip and said lever being attached to and forming a terminal end of said handlebar;

providing a primary sleeve having an end wall and a perimeter wall being attached to said end wall, said perimeter wall having a distal end with respect to said end wall, said distal end defining a primary opening into an interior of said primary sleeve, said primary sleeve being comprised of a resiliently compressible material;

extending said grip into said primary opening and covering said grip with said primary sleeve;

providing a secondary sleeve, said secondary sleeve having a back wall and a peripheral wall being attached to and extending away from said back wall, said peripheral wall being attached to said perimeter wall to place an interior of said secondary sleeve in communication with the interior of said primary sleeve, a juncture of said perimeter wall and said peripheral wall forming a secondary opening, said secondary sleeve being comprised of a resiliently compressible material, said secondary sleeve extending away from said primary opening, said secondary sleeve forming an angle with respect to said perimeter wall between 10 degrees and 45 degrees;

extending said lever into said secondary sleeve when said grip is extended into said primary sleeve to cover said lever with said secondary sleeve; and working on the motorcycle by a mechanic, said primary sleeve and said secondary sleeve preventing injury to the mechanic by said grip and said lever.

\* \* \* \* \*